(12) United States Patent
Ejima et al.

(10) Patent No.: US 12,292,130 B2
(45) Date of Patent: May 6, 2025

(54) CAPACITY CONTROL VALVE

(71) Applicant: Eagle Industry Co., Ltd., Tokyo (JP)

(72) Inventors: Takahiro Ejima, Tokyo (JP); Keigo Shirafuji, Tokyo (JP); Kohei Fukudome, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 315 days.

(21) Appl. No.: 17/417,701

(22) PCT Filed: Jan. 17, 2020

(86) PCT No.: PCT/JP2020/001443
§ 371 (c)(1),
(2) Date: Jun. 23, 2021

(87) PCT Pub. No.: WO2020/153244
PCT Pub. Date: Jul. 30, 2020

(65) Prior Publication Data
US 2022/0057010 A1 Feb. 24, 2022

(30) Foreign Application Priority Data
Jan. 21, 2019 (JP) .................................. 2019-007626

(51) Int. Cl.
*F16K 27/08* (2006.01)
*F16K 17/08* (2006.01)
(Continued)

(52) U.S. Cl.
CPC ............ *F16K 27/10* (2013.01); *F16K 17/087* (2013.01); *F16K 27/048* (2013.01);
(Continued)

(58) Field of Classification Search
CPC .... F16K 17/087; F16K 31/126; F16K 27/048; F16K 27/10–107; F16K 5/207;
(Continued)

(56) References Cited

U.S. PATENT DOCUMENTS 1,493,253 A * 5/1924 Eggleston ............... F16K 35/00
251/270
1,802,093 A * 4/1931 Slagel ..................... F16K 41/10
137/382

(Continued)

FOREIGN PATENT DOCUMENTS

EP 1081378 3/2001 .............. F04B 27/18
EP 2594794 5/2013 .............. F04B 27/18
(Continued)

OTHER PUBLICATIONS

Machine translation for WO2011/021789A2; taken from WIPO website on Jul. 27, 2023{https://patentscope.wipo.int/} (Year: 2011).*
(Continued)

*Primary Examiner* — Craig J Price
(74) *Attorney, Agent, or Firm* — HAYES SOLOWAY P.C.

(57) ABSTRACT

A capacity control valve includes a main valve that opens and closes communication between a discharge port and a control port formed in a valve housing by movement of a rod driven by a solenoid, a CS communication passage providing communication between a control fluid supply chamber formed in the valve housing and a suction port, and an on-off valve formed by a communication passage forming member having an annular valve seat in an outer periphery of the CS communication passage and an on-off valve element biased in the valve closing direction with respect to the valve seat.

16 Claims, 7 Drawing Sheets

(51) Int. Cl.
*F16K 27/04* (2006.01)
*F16K 27/10* (2006.01)
*F04B 27/10* (2006.01)
*F04B 27/18* (2006.01)
*F04B 53/10* (2006.01)

(52) U.S. Cl.
CPC ....... *F04B 27/1036* (2013.01); *F04B 27/1804* (2013.01); *F04B 53/1087* (2013.01)

(58) Field of Classification Search
CPC ........... F16K 41/10–125; F16K 41/103; F04B 2027/1809–1895; F04B 39/10; F04B 43/08; F04B 53/1087; F04B 27/1036; F04B 27/1804; F04B 2027/1831; F04B 2027/1827; F16J 15/363; F16J 15/04; F16J 15/3472; F16J 15/34; F16J 15/3468; F16J 15/3448; B23K 31/02; Y10T 29/49877; Y10T 137/7761; Y10T 137/7762
USPC ...... 417/222.2, 272, 307; 251/45, 46, 335.3, 251/129.03; 62/228.3, 228.5; 137/625.17; 285/226–229, 299–301; 138/121; 92/34–37; 29/454, DIG. 48
See application file for complete search history.

(56) References Cited

U.S. PATENT DOCUMENTS

| | | | | |
|---|---|---|---|---|
| 2,068,626 A * | 1/1937 | Clifford | ................... | G01K 5/42 92/43 |
| 2,114,139 A * | 4/1938 | Crosthwait, Jr. | ....... | F16K 1/523 251/267 |
| 2,145,575 A * | 1/1939 | Zwickl | ................... | F25B 41/26 137/625 |
| 2,308,183 A * | 1/1943 | Lewis | .................... | F16K 41/10 251/368 |
| 2,617,621 A * | 11/1952 | Hobbs | ................... | F16K 41/10 251/273 |
| 2,852,041 A * | 9/1958 | Stinson | ................ | F16K 41/103 74/18 |
| 3,090,403 A * | 5/1963 | Kroekel | ................... | F16J 3/047 285/227 |
| 3,206,165 A * | 9/1965 | Salmon | ................... | F16K 41/10 251/367 |
| 3,212,525 A * | 10/1965 | Henderson | ............ | F16K 31/126 137/494 |
| 3,233,632 A * | 2/1966 | Voitik | ................... | F16J 3/047 29/454 |
| 3,278,156 A * | 10/1966 | Callahan, Jr. | ........... | F16K 41/10 251/335.1 |
| 3,744,751 A * | 7/1973 | Robinson | .............. | F16K 17/042 137/540 |
| 3,787,023 A * | 1/1974 | Shufflebarger | .......... | F16K 41/10 251/335.3 |
| 4,166,607 A * | 9/1979 | Webb | ........................ | F16K 1/10 251/273 |
| 4,457,213 A * | 7/1984 | Morgan | ................... | F16J 3/047 29/454 |
| 4,462,422 A * | 7/1984 | Owoc | ................... | F16K 41/106 251/335.1 |
| 4,516,754 A * | 5/1985 | Owoc | ................... | F16K 5/0647 251/214 |
| 4,687,419 A | 8/1987 | Suzuki | ................ | F04B 27/1804 |
| 4,909,271 A * | 3/1990 | Canaan | ................... | F16K 41/10 137/240 |
| 4,995,589 A * | 2/1991 | Adishian | ............ | F16K 31/1221 251/63.5 |
| 5,056,759 A * | 10/1991 | Schlesch | ................ | F16K 41/10 277/411 |
| 5,375,854 A * | 12/1994 | Carlisle | ................... | F16J 15/04 277/377 |
| 6,010,312 A | 1/2000 | Suitou et al. | ............. | F04B 1/26 |
| 6,062,823 A * | 5/2000 | Kawaguchi | ......... | F04B 27/1804 251/129.02 |
| 6,098,663 A * | 8/2000 | Larsen | ................... | F16L 51/028 218/135 |
| 6,244,159 B1 * | 6/2001 | Kimura | ............... | F04B 27/1036 92/12.2 |
| 6,354,811 B1 | 3/2002 | Ota et al. | ................... | 417/222.2 |
| 6,358,017 B1 | 3/2002 | Ota et al. | ................... | 417/222.2 |
| 6,361,283 B1 | 3/2002 | Ota et al. | ................... | 417/222.2 |
| 6,485,267 B1 | 11/2002 | Imai et al. | ................ | F04B 1/26 |
| 6,772,990 B2 * | 8/2004 | Sasaki | ................ | F16K 31/0627 62/228.3 |
| 7,806,666 B2 * | 10/2010 | Umemura | .......... | F04B 27/1804 417/213 |
| 8,021,124 B2 * | 9/2011 | Umemura | .......... | F04B 27/1804 251/333 |
| 8,079,827 B2 * | 12/2011 | Iwa | ..................... | F04B 27/1804 417/222.2 |
| 8,727,355 B2 * | 5/2014 | Takahashi | .................. | F16J 3/04 277/500 |
| 8,757,988 B2 * | 6/2014 | Fukudome | .......... | F04B 27/1804 417/270 |
| 9,132,714 B2 * | 9/2015 | Futakuchi | .......... | B60H 1/00485 |
| 9,181,937 B2 * | 11/2015 | Ota | ..................... | F04B 27/1804 |
| 9,206,919 B2 * | 12/2015 | Neumeister | ............. | F16K 27/02 |
| 9,523,987 B2 * | 12/2016 | Fukudome | .......... | G05D 7/0106 |
| 9,568,108 B2 * | 2/2017 | Takahashi | .......... | F16J 15/3496 |
| 9,732,874 B2 | 8/2017 | Saeki | ................ | F04B 27/1804 |
| 9,777,863 B2 | 10/2017 | Higashidozono | ... | F04B 27/1804 |
| 9,863,411 B2 * | 1/2018 | Saeki | ...................... | F04B 39/10 |
| 9,903,362 B2 * | 2/2018 | Saeki | ................ | F04B 27/1804 |
| 9,964,102 B2 * | 5/2018 | Kondo | ................ | F04B 27/1045 |
| 10,077,849 B2 * | 9/2018 | Iwa | ......................... | F16K 11/0716 |
| 10,557,463 B2 * | 2/2020 | Sugamura | ........... | F04B 27/1804 |
| 10,619,744 B2 * | 4/2020 | Glime, III | ................ | F16K 1/12 |
| 10,697,548 B2 * | 6/2020 | Iguchi | ........................ | F16J 15/34 |
| 10,711,902 B2 * | 7/2020 | Tanikawa | ................ | F16K 1/36 |
| 10,781,804 B2 | 9/2020 | Higashidozono et al. | ................ | F04B 27/18 |
| 10,883,606 B2 * | 1/2021 | Takigahira | ........... | F16J 15/3452 |
| 11,053,933 B2 | 7/2021 | Warren | ................ | F04B 27/1804 |
| 11,054,058 B2 * | 7/2021 | Hill | ........................ | F16K 1/126 |
| 11,085,431 B2 | 8/2021 | Fukudome | .............. | F04B 27/18 |
| 11,156,301 B2 | 10/2021 | Hayama | ................ | F16K 11/105 |
| 11,225,962 B2 | 1/2022 | Kurihara | ................ | G05D 7/0635 |
| 11,319,940 B2 | 5/2022 | Hayama | ................ | F16K 11/0716 |
| 11,326,585 B2 * | 5/2022 | Hayama | ................ | F04B 49/225 |
| 11,359,624 B2 | 6/2022 | Kurihara et al. | ....... | F04B 49/12 |
| 11,378,194 B2 * | 7/2022 | Fukudome | .............. | F16K 11/22 |
| 11,391,388 B2 * | 7/2022 | Fukudome | .............. | F16K 11/10 |
| 11,454,227 B2 * | 9/2022 | Hayama | ................ | F04B 27/18 |
| 11,473,683 B2 * | 10/2022 | Hayama | ................ | F04B 27/1804 |
| 11,473,684 B2 * | 10/2022 | Hayama | ................ | F04B 27/1804 |
| 11,480,166 B2 * | 10/2022 | Hayama | ................ | F16K 31/0603 |
| 11,519,399 B2 * | 12/2022 | Kurihara | ................ | F04B 49/22 |
| 11,536,257 B2 * | 12/2022 | Hayama | ................ | F04B 27/10 |
| 11,542,930 B2 * | 1/2023 | Higashidozono | ....... | F16K 31/06 |
| 11,542,931 B2 * | 1/2023 | Hayama | ................ | F04B 49/22 |
| 11,555,489 B2 * | 1/2023 | Hayama | ................ | F04B 27/10 |
| 11,598,437 B2 * | 3/2023 | Ejima | ................ | F16K 17/0486 |
| 11,635,152 B2 * | 4/2023 | Hayama | ................ | F04B 27/1804 251/129.15 |
| 11,821,540 B2 * | 11/2023 | Hayama | ................ | F16K 17/0406 |
| 11,841,090 B2 * | 12/2023 | Hayama | ................ | F16K 31/0613 |
| 11,873,805 B2 * | 1/2024 | Hayama | ................ | F04B 27/1804 |
| 11,927,275 B2 * | 3/2024 | Hayama | ................ | F16K 31/1226 |
| 11,994,120 B2 * | 5/2024 | Hayama | ................ | F04B 27/1804 |
| 12,012,948 B2 * | 6/2024 | Hayama | ................ | B60H 1/3216 |
| 12,018,663 B2 * | 6/2024 | Kurihara | ................ | F16K 11/22 |
| 12,025,997 B2 * | 7/2024 | Jones | ................ | G05D 16/0619 |
| 12,110,882 B2 * | 10/2024 | Kurihara | ................ | F16K 31/061 |
| 2004/0060604 A1 | 4/2004 | Uemura et al. | ............. | 137/595 |
| 2005/0035321 A1 | 2/2005 | Uemura | ................ | F16K 27/041 |
| 2005/0287014 A1 | 12/2005 | Umemura | ............ | F04B 27/1804 |
| 2006/0218953 A1 | 10/2006 | Hirota | .......................... | 62/228.5 |
| 2007/0214814 A1 | 9/2007 | Umemura et al. | ........... | 62/228.1 |
| 2008/0138213 A1 | 6/2008 | Umemura | ............ | F04B 27/1804 |

(56) References Cited

U.S. PATENT DOCUMENTS

| | | | |
|---|---|---|---|
| 2009/0108221 A1 | 4/2009 | Umemura | F04B 27/1804 |
| 2009/0183786 A1 | 7/2009 | Iwa et al. | 137/487.5 |
| 2012/0198992 A1 | 8/2012 | Futakuchi et al. | 91/505 |
| 2012/0198993 A1* | 8/2012 | Fukudome | F04B 27/1804 91/505 |
| 2013/0126017 A1 | 5/2013 | Ota et al. | F04B 27/1804 |
| 2014/0130916 A1 | 5/2014 | Saeki | F04B 27/1804 |
| 2015/0004010 A1 | 1/2015 | Saeki | F04B 27/1804 |
| 2015/0010410 A1 | 1/2015 | Saeki et al. | F04B 49/225 |
| 2015/0060708 A1* | 3/2015 | Glime, III | F16K 31/1225 251/335.1 |
| 2015/0068628 A1 | 3/2015 | Iwa et al. | F16K 31/06 |
| 2015/0211506 A1 | 7/2015 | Shirafuji et al. | F04B 27/1804 |
| 2015/0345655 A1 | 12/2015 | Higashidozono et al. | F16K 31/0624 |
| 2016/0290326 A1 | 10/2016 | Sugamura | F04B 27/1804 |
| 2017/0175726 A1 | 6/2017 | Kume | F04B 27/1804 |
| 2017/0028462 A1 | 10/2017 | Hayama et al. | F16K 47/06 |
| 2017/0284562 A1 | 10/2017 | Hayama et al. | F16K 47/06 |
| 2017/0356430 A1 | 12/2017 | Irie et al. | F04B 27/1804 |
| 2017/0363074 A1 | 12/2017 | Taguchi | F04B 27/1081 |
| 2018/0291888 A1 | 10/2018 | Tonegawa | F16K 31/0624 |
| 2020/0362974 A1 | 11/2020 | Hayama | F04B 49/22 |
| 2021/0123422 A1* | 4/2021 | Hayama | F16K 31/0603 |
| 2021/0123423 A1* | 4/2021 | Hayama | F04B 27/10 |
| 2021/0131413 A1* | 5/2021 | Hayama | F16K 11/24 |
| 2021/0285433 A1* | 9/2021 | Hayama | F16K 11/10 |
| 2022/0034414 A1 | 2/2022 | Ito | F04B 27/18 |
| 2022/0057005 A1* | 2/2022 | Hayama | F04B 27/18 |
| 2022/0057010 A1* | 2/2022 | Ejima | F04B 27/1009 |

FOREIGN PATENT DOCUMENTS

| | | | |
|---|---|---|---|
| EP | 2784320 | 10/2014 | F04B 27/18 |
| EP | 3431760 | 1/2019 | F04B 27/18 |
| JP | 5-306679 | 11/1993 | F04B 27/08 |
| JP | 6-200875 | 7/1994 | F04B 27/08 |
| JP | 7-27049 | 1/1995 | F04B 27/10 |
| JP | 9-144929 | 6/1997 | F16K 31/06 |
| JP | 10-148258 | 6/1998 | F16J 3/04 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2003-42062 | 2/2003 | F04B 27/14 |
| JP | 2006-52648 | 2/2006 | F04B 27/14 |
| JP | 2006-307828 | 11/2006 | F04B 27/14 |
| JP | 2007-247512 | 9/2007 | F04B 27/14 |
| JP | 2008-14269 | 1/2008 | F04B 27/14 |
| JP | 2008-202572 | 9/2008 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 5167121 | 12/2012 | F04B 27/14 |
| JP | 2014-118939 | 6/2014 | F04B 27/14 |
| JP | 5557901 | 6/2014 | F04B 27/14 |
| JP | 2014-190247 | 10/2014 | F04B 27/14 |
| JP | 2016-196876 | 11/2016 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-21646 | 2/2018 | F16K 31/06 |
| JP | 2018-40385 | 3/2018 | F16K 31/06 |
| JP | 2018-145877 | 9/2018 | F04B 39/14 |
| JP | 2019-2384 | 1/2019 | F04B 27/18 |
| WO | WO2007119380 | 10/2007 | F04B 27/14 |
| WO | WO2011021789 | 2/2011 | F04B 27/14 |
| WO | WO2011065693 | 6/2011 | F04B 27/14 |
| WO | WO2011135911 | 11/2011 | F04B 27/14 |
| WO | WO2013109005 | 7/2013 | F04B 46/06 |
| WO | WO2013176012 | 11/2013 | F04B 27/14 |
| WO | WO2014091975 | 6/2014 | F04B 27/14 |
| WO | WO2014119594 | 8/2014 | F04B 27/14 |
| WO | WO2016104390 | 6/2016 | F16K 31/06 |
| WO | WO2017057160 | 4/2017 | F04B 27/18 |
| WO | WO2017159553 | 9/2017 | F04B 27/18 |
| WO | WO2018207461 | 11/2018 | F04B 27/18 |
| WO | WO2019146674 | 8/2019 | F04B 27/18 |
| WO | WO2019167912 | 9/2019 | F04B 27/18 |

OTHER PUBLICATIONS

Chinese Official Action issued in related application serial No. 202080016397.7, dated Aug. 3, 2022, with translation, 10 pages.

Chinese Official Action issued in related application serial No. 202080007416.X, dated Jul. 28, 2022, with translation, 9 pages.

European Official Action issued in related application serial No. 20782597.7, dated Oct. 19, 2022, 5 pages.

US Official Action issued in related U.S. Appl. No. 17/256,955, dated Aug. 23, 2022, 17 pages.

US Notice of Allowance issued in related U.S. Appl. No. 17/256,959, dated Sep. 7, 2022, 13 pages.

www.lexico.com/en/definition/connected accessed Aug. 15, 2022, Year 2022.

International Search Report and Written Opinion issued in PCT/JP2019/002207, dated Apr. 23, 2019, with English translation, 13 pages.

International Preliminary Report on Patentability issued in PCT/JP2019/002207, dated Jul. 28, 2020, 7 pages.

International Search Report and Written Opinion issued in PCT/JP2019/005200, dated Apr. 23, 2019, with English translation, 12 pages.

International Preliminary Report on Patentability issued in PCT/JP2019/005200, dated Aug. 18, 2020, 7 pages.

International Search Report and Written Opinion issued in PCT/JP2019/007187, dated Apr. 23, 2019, with English translation, 16 pages.

International Preliminary Report on Patentability issued in PCT/JP2019/007187, Sep. 3, 2020, 8 pages.

International Search Report and Written Opinion issued in PCT/JP2019/020196, dated Aug. 27, 2019, with English translation, 11 pages.

International Preliminary Report on Patentability issued in PCT/JP2019/020196, dated Nov. 24, 2020, with English translation, 6 pages.

International Search Report and Written Opinion issued in PCT/JP2019/005199, dated Apr. 23, 2019, with English translation, 12 pages.

International Preliminary Report on Patentability issued in PCT/JP2019/005199, dated Aug. 18, 2020, 4 pages.

International Search Report and Written Opinion issued in PCT/JP2019/027112, dated Oct. 15, 2019, with English translation, 10 pages.

International Preliminary Report on Patentability issued in PCT/JP2019/027112, dated Jan. 19, 2021, 4 pages.

International Search Report and Written Opinion issued in PCT/JP2019/027071, dated Oct. 15, 2019, with English translation, 12 pages.

International Preliminary Report on Patentability issued in PCT/JP2019/027071, dated Jan. 12, 2021, 4 pages.

International Search Report and Written Opinion issued in PCT/JP2019/027072, dated Oct. 8, 2019, with English translation, 10 pages.

International Preliminary Report on Patentability issued in PCT/JP2019/027072, dated Jan. 12, 2021, 4 pages.

International Search Report and Written Opinion issued in PCT/JP2019/027073, dated Oct. 15, 2019, with English translation, 10 pages.

International Preliminary Report on Patentability issued in PCT/JP2019/027073, dated Jan. 12, 2021, 4 pages.

International Search Report and Written Opinion issued in PCT/JP2019/031067, dated Oct. 15, 2019, with English translation, 18 pages.

International Preliminary Report on Patentability issued in PCT/JP2019/031067, dated Feb. 9, 2021, 6 pages.

(56) References Cited

OTHER PUBLICATIONS

International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
US Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.
International Search Report and Written Opinion issued in PCT/JP2021/015598, dated Jun. 15, 2021, with English translation, 13 pages.
International Preliminary Report on Patentability issued in PCT/JP2020/015598, dated Oct. 25, 2022, 5 pages.
Chinese Official Action issued in related application serial No. 202080026878.6, dated Oct. 9, 2022, with translation, 9 pages.
Chinese Official Action issued in related application serial No. 201980046750.3, dated Nov. 3, 2022, with translation, 11 pages.
European Official Action issued in related application serial No. 20744724.4, dated Sep. 16, 2022, 8 pages.
European Official Action issued in related application serial No. 20765478.1, dated Nov. 3, 2022, 7 pages.
European Official Action issued in related application serial No. 20783639.6, dated Nov. 22, 2022, 8 pages.
US Official Action issued in related U.S. Appl. No. 17/299,285, dated Mar. 31, 2022, 11 pages.
Chinese Official Action issued in related application serial No. 201980044409.4, dated Jan. 26, 2022, with translation, 10 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 10 pages.
Chinese Official Action issued in related application serial No. 201980047614.6, dated Apr. 26, 2022, with translation, 9 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
European Search Report issued in related application serial No. 19894059.5. dated Jun. 7, 2022, 4 pages.
European Search Report issued in related application serial No. 19883193.5, dated May 23, 2022, 5 pages.
US Official Action issued in related U.S. Appl. No. 17/256,953, dated Apr. 15, 2022, 18 pages.
US Official Action issued in related U.S. Appl. No. 17/259,138, dated Mar. 31, 2022, 5 pages.
US Official Action issued in related U.S. Appl. No. 17/256,955, dated Feb. 18, 2022, 19 pages.
US Official Action issued in related U.S. Appl. No. 17/259,138, dated Jan. 19, 2022, 6 pages.
US Official Action issued in related U.S. Appl. No. 17/256,959, dated May 5, 2022, 18 pages.
US Official Action issued in related U.S. Appl. No. 17/433,558, dated May 25, 2022, 11 pages.
Chinese Official Action issued in related application serial No. 201980046798.4, dated Dec. 5, 2022, with translation, 13 pages.
Chinese Official Action issued in related application serial No. 201980046750.3, dated Mar. 1, 2023, with translation, 12 pages.
Chinese Official Action issued in related application serial No. 202080026386.7, dated Oct. 31, 2022, with translation, 8 pages.
European Official Action issued in related application serial No. 19847690.5, dated Jul. 10, 2023, 4 pages.
US Official Action issued in related U.S. Appl. No. 17/599,539, dated Apr. 25, 2023, 6 pages.
US Official Action issued in related U.S. Appl. No. 17/258,692, dated Aug. 3, 2023, 8 pages.
US Official Action issued in related U.S. Appl. No. 17/600,547, dated Sep. 13, 2023, 13 pages.
US Official Action issued in related U.S. Appl. No. 17/258,708, dated Sep. 25, 2023, 5 pages.
Notice of Allowance issued in related U.S. Appl. No. 17/599,539, dated Jul. 25, 2023, 4 pages.
Notice of Allowance issued in related U.S. Appl. No. 17/258,692, dated Sep. 27, 2023, 5 pages.
Korean Official Action issued in related application serial No. 10-2021-7019897, dated Oct. 21, 2023, 10 pages.
US Official Action issued in related U.S. Appl. No. 17/256,947, dated Nov. 20, 2023, 10 pages.
Notice of Allowance issued in related U.S. Appl. No. 17/258,708, dated Dec. 21, 2023, 6 pages.
Notice of Allowance issued in related U.S. Appl. No. 17/600,547, dated Nov. 28, 2023, 6 pages.
Korean Official Action issued in related application serial No. 10-2021-7035024, dated Jan. 2, 2024, 12 pages with translation.
Korean Official Action dated Apr. 1, 2024 issued in related Korean Application Serial No. 10-2022-7038444, with translation, 6 pages.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/258,692, filed Jan. 7, 2021.
U.S. Appl. No. 17/256,955, filed Dec. 29, 2020.
U.S. Appl. No. 17/433,558, filed Aug. 24, 2021.

(56) References Cited

OTHER PUBLICATIONS

U.S. Appl. No. 17/256,947, filed Dec. 29, 2020.
U.S. Appl. No. 17/258,708, filed Jan. 7, 2021.
U.S. Appl. No. 17/259,138, filed Jan. 8, 2021.
U.S. Appl. No. 17/600,547, filed Sep. 30, 2021.
U.S. Appl. No. 17/599,539, filed Sep. 28, 2021.
European Official Action dated Mar. 11, 2024 issued in related European Application Serial No. 21792456.2, 7 pages.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, the capacity control valve performs normal control in which energization is controlled by a control computer, a valve element is moved in the axial direction by electromagnetic force generated in a solenoid, and a main valve is opened and closed to adjust the control pressure Pc of the control chamber of the variable displacement compressor.

At the time of the normal control of the capacity control valve, the pressure of the control chamber in the variable displacement compressor is appropriately controlled, and by continuously changing the tilt angle of the swash plate with respect to the rotating shaft, the stroke amount of the pistons is changed to control the discharge amount of the fluid to the discharge chamber. Thus, the air conditioning system is adjusted to have a desired cooling ability.

There is also a known capacity control valve in which a liquid coolant discharging CS communication passage providing communication between a control port and a suction port of the capacity control valve is formed, and at the time of start-up, a coolant of a control chamber of a variable displacement compressor is discharged to a suction chamber of the variable displacement compressor through the control port, the CS communication passage, and the suction port, so that pressure of the control chamber is promptly lowered at the time of start-up to improve responsiveness of the variable displacement compressor (see Patent Citation 1). In detail, the capacity control valve includes an on-off valve element formed by welding a cap to a bellows core in a sealed manner, and by contracting the bellows core and separating the cap of the on-off valve element from the valve seat by receiving suction pressure Ps in the CS communication passage formed in a communication passage forming member which has an annular valve seat on which the cap is seated with an end surface of the cap, the CS communication passage can be opened.

CITATION LIST

Patent Literature

Patent Citation 1: JP 2008-202572 A (PAGE 6, FIG. 2)

SUMMARY OF INVENTION

Technical Problem

In the capacity control valve of Patent Citation 1, by receiving an increase of the suction pressure Ps in the CS communication passage with a recessed portion formed on the inner diameter side of the cap, the bellows core is contracted to open the CS communication passage when the suction pressure Ps is high, so that the coolant of the control chamber can be discharged to the suction chamber. However, the recessed portion is formed in the cap and an annular projected portion is formed on the outside of the recessed portion. Thus, a pressure receiving surface of the suction pressure Ps in the recessed portion of the cap is narrowed down, and high suction pressure Ps is required for opening the CS communication passage. When an opening of the communication passage forming member is enlarged to extend the pressure receiving surface of the suction pressure Ps to an outer peripheral end portion of the cap, there is a fear that the cap cannot be precisely seated on the valve seat while being influenced by a welding bead formed by welding the cap and the bellows core.

The present invention is achieved focusing on such problems, and an object thereof is to provide a capacity control valve not influenced by a welding bead while ensuring largeness of a pressure receiving surface of a cap.

Solution to Problem

In order to solve the foregoing problems, a capacity control valve according to the present invention is a capacity control valve including: a valve housing provided with a discharge port through which a discharge fluid of discharge pressure passes, a suction port through which a suction fluid of suction pressure passes, and a control port through which a control fluid of control pressure passes; a rod driven by a solenoid; a main valve constituted by a main valve seat and a main valve element, the main valve configured to open and close a communication between the discharge port and the control port in accordance with a movement of the rod; a CS communication passage providing a communication between a control fluid supply chamber and the suction port, the control fluid supply chamber being formed in the valve housing and having the control fluid supplied thereinto; and an on-off valve having a communication passage forming member provided with an annular valve seat in an outer periphery of the CS communication passage and an on-off valve element biased in a valve closing direction of the on-off valve toward the annular valve seat, wherein the on-off valve element further has a cap configured for seating on and separating from the valve seat, and a bellows core provided with an axial end portion welded to an outer peripheral end portion of the cap, and a recessed portion that houses a welding bead formed between the bellows core and the cap is provided in the outer peripheral end portion of the cap. According to the aforesaid feature of the present invention, the welding bead formed at a welding point to the bellows core is housed in the recessed portion provided in the outer peripheral end portion of the cap, and a protrusion of the welding bead to the valve seat side is suppressed.

Thereby, it is possible to precisely seat the cap on the valve seat. Therefore, it is possible to provide the capacity control valve not influenced by the welding bead while ensuring largeness of a pressure receiving surface of the cap.

It might be preferable that the recessed portion is formed on an outer periphery of a sea face of the cap continuously to the seal face, the seal face of the cap being seated on and separated from the valve seat. According to this preferable configuration, it is possible to reduce thickness of the cap while ensuring the largeness of the pressure receiving surface of the cap.

It might be preferable that the recessed portion is formed in a stepwise shape. According to this preferable configuration, the welding bead is more easily housed in the recessed portion, and it is possible to reliably suppress an influence of the welding bead.

It might be preferable that an outer diameter of the cap is not more than an outer diameter of the bellows core. According to this preferable configuration, it is possible to compactify the outer diameter of the on-off valve element.

It might be preferable that the axial end portion of the bellows core is folded toward an outer diameter side and welded to the outer peripheral end portion of the cap. According to this preferable configuration, it is possible to ensure strength of the outer peripheral end portion while reducing the thickness of the cap.

It might be preferable that the cap and the bellows core are welded to each other in such a manner that an edge of the outer peripheral end portion of the cap and an edge of the axial end portion of the bellows core are aligned with each other. According to this preferable configuration, it is possible to enhance strength of both the outer diameter end portions of the cap and the bellows core.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 5. Hereinafter, description will be given with the left and right sides seen from the front side of FIG. 2 being the left and right sides of the capacity control valve.

A capacity control valve V of the present invention is assembled into a variable displacement compressor M used for an air conditioning system of an automobile, etc. By variably controlling pressure of a working fluid (hereinafter, simply referred to as the "fluid") serving as a coolant, a discharge amount of the variable displacement compressor M is controlled and the air conditioning system is adjusted to have a desired cooling ability.

Figure 1:
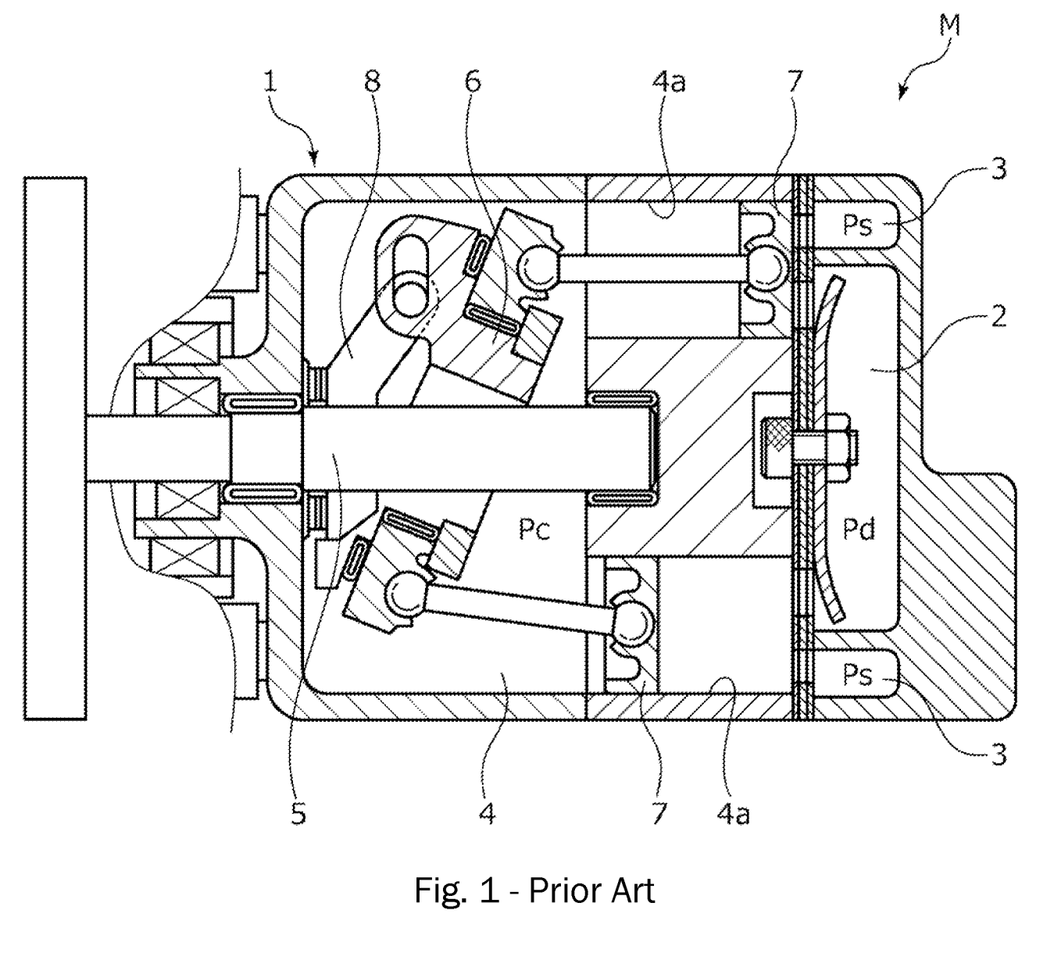
FIG. 1 is a schematic configuration diagram showing a swash plate type variable displacement compressor into which a capacity control valve of according to a first embodiment of the present invention is assembled.

First of all, the variable displacement compressor M will be described. As shown in FIG. 1, the variable displacement compressor M has a casing 1 including a discharge chamber 2, a suction chamber 3, a control chamber 4, and plural cylinders 4a. A communication passage (not shown) providing direct communication between the control chamber 4 and the suction chamber 3 is provided in the variable displacement compressor M. A fixed orifice for adjusting to balance pressure between the suction chamber 3 and the control chamber 4 is provided in this communication passage.

The variable displacement compressor M also includes a rotating shaft 5 to be driven and rotated by an engine (not shown) installed outside the casing 1, a swash plate 6 coupled to the rotating shaft 5 in an eccentric state by a hinge mechanism 8 in the control chamber 4, and plural pistons 7 coupled to the swash plate 6 and fitted reciprocatably in the respective cylinders 4a. With using the capacity control valve V to be driven to open and close by electromagnetic force, a tilt angle of the swash plate 6 is continuously changed by appropriately controlling pressure in the control chamber 4 while utilizing suction pressure Ps of the suction chamber 3 that suctions the fluid, discharge pressure Pd of the discharge chamber 2 that discharges the fluid pressurized by the pistons 7, and control pressure Pc of the control chamber 4 that houses the swash plate 6. Thereby, a stroke amount of the pistons 7 is changed to control a discharge amount of the fluid. For convenience of description, the capacity control valve V assembled into the variable displacement compressor M is not shown in FIG. 1.

Specifically, the higher the control pressure Pc in the control chamber 4 is, the smaller the tilt angle of the swash plate 6 with respect to the rotating shaft 5 becomes, and the more the stroke amount of the pistons 7 is reduced. However, when the pressure becomes fixed pressure or more, the swash plate 6 is brought into a substantially perpendicular state with respect to the rotating shaft 5, that is, a state where the swash plate is slightly tilted from the exactly perpendicular state. At this time, the stroke amount of the pistons 7 becomes minimum, and pressurization of the fluid in the cylinders 4a by the pistons 7 becomes minimum. Therefore, the discharge amount of the fluid to the discharge chamber 2 is reduced, and the cooling ability of the air conditioning system becomes minimum. Meanwhile, the lower the control pressure Pc in the control chamber 4 is, the larger the tilt angle of the swash plate 6 with respect to the rotating shaft 5 becomes, and the more the stroke amount of the pistons 7 is increased. However, when the pressure becomes fixed pressure or less, the tilt angle of the swash plate 6 with respect to the rotating shaft 5 becomes maximum. At this time, the stroke amount of the pistons 7 becomes maximum, and the pressurization of the fluid in the cylinders 4a by the pistons 7 becomes maximum. Therefore, the discharge amount of the fluid to the discharge chamber 2 is increased, and the cooling ability of the air conditioning system becomes maximum.

Figure 2:
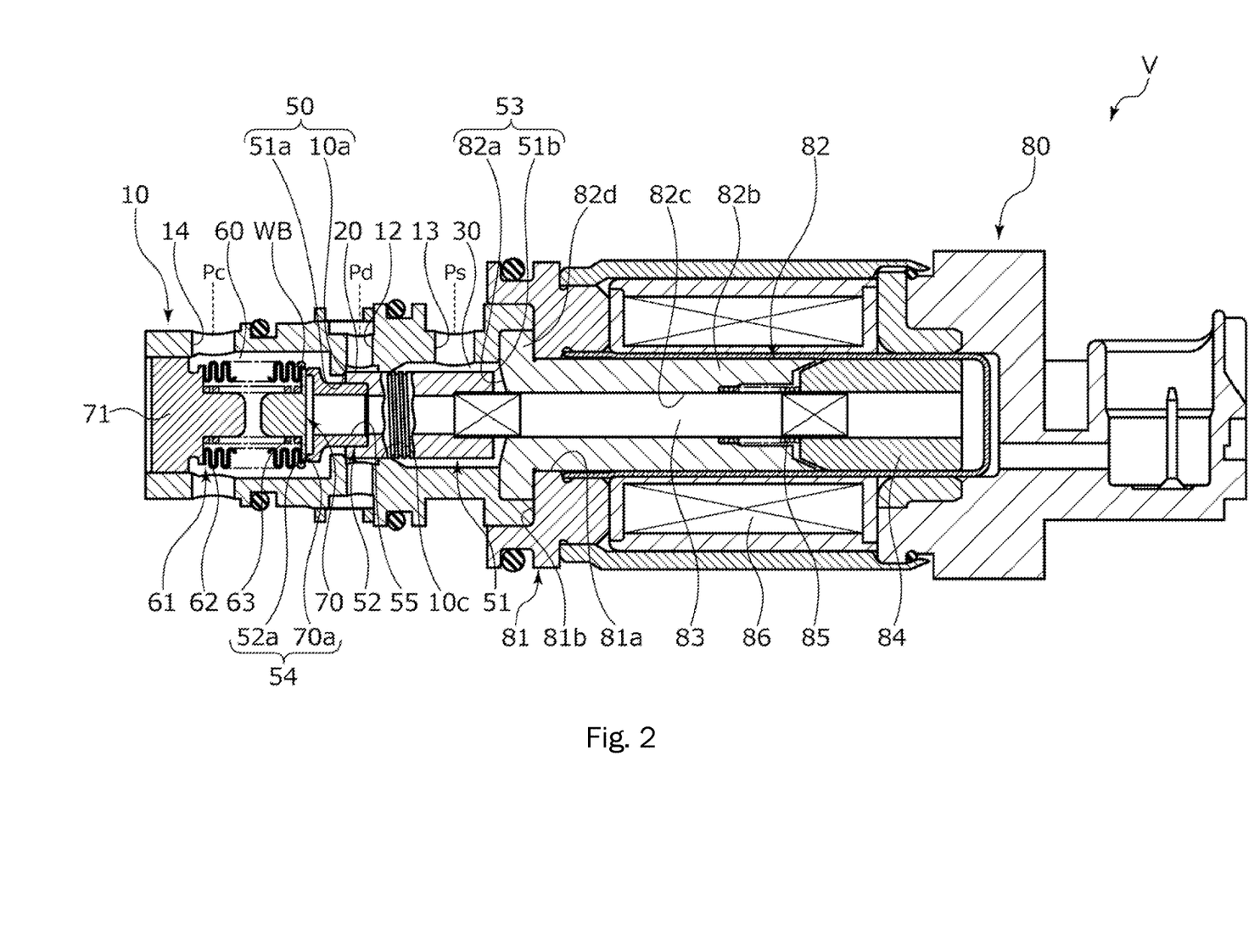
FIG. 2 is a sectional view showing a state where a main valve is closed and an auxiliary valve is opened in an energized state of the capacity control valve in the first embodiment.

As shown in FIG. 2, the capacity control valve V assembled into the variable displacement compressor M adjusts an electric current energized in a coil 86 forming a solenoid 80 and performs open/close control of a main valve 50 and an auxiliary valve 53 in the capacity control valve V, and also performs open/close control of a pressure sensitive valve 54 serving as an on-off valve by suction pressure Ps in an intermediary communication passage 55 serving as a CS communication passage, so that by controlling the fluid flowing into the control chamber 4 or flowing out from the control chamber 4, the control pressure Pc in the control chamber 4 is variably controlled. The intermediary communication passage 55 passes through over the axial direction by connecting a main/auxiliary valve element 51 serving as a main valve element and a hollow hole formed inside a pressure sensitive valve member 52 serving as a communication passage forming member, and forms a flow passage for discharging a liquid coolant. In detail, partly due to liquefication of the fluid whose pressure is increased by leaving the variable displacement compressor M in a stop state for a long time, but by closing the main valve 50 and opening the auxiliary valve 53 by start-up of the variable displacement compressor M and energization of the capacity control valve V, and further by contracting a pressure sensitive body 61 and opening the pressure sensitive valve 54 by high suction pressure Ps in the intermediary communication passage 55, the liquid coolant of the control chamber 4 can be discharged to the suction chamber 3 via the intermediary communication passage 55 for a short time.

In the present embodiment, the main valve 50 is formed by the main/auxiliary valve element 51 and a main valve seat 10a formed in a valve housing 10, and by bringing and separating an axially left end 51a of the main/auxiliary valve element 51 into contact with and from the main valve seat 10a, the main valve 50 is opened and closed. The auxiliary valve 53 is formed by the main/auxiliary valve element 51 and an auxiliary valve seat 82a formed on the inner diameter side of an axially left end surface which serves as an opening end surface of a fixed iron core 82, and by bringing and separating an axially right end 51b of the main/auxiliary valve element 51 into contact with and from the auxiliary valve seat 82a, the auxiliary valve 53 is opened and closed. The pressure sensitive valve 54 is formed by a cap 70 forming the pressure sensitive body 61 which serves as an on-off valve element and a pressure sensitive valve seat 52a serving as an annular valve seat which is formed in an axially left end of the pressure sensitive valve member 52. By bringing a seal face 70a formed on the outer diameter side of an axially right end of the cap 70 into contact with and from the pressure sensitive valve seat 52a, the pressure sensitive valve 54 is opened and closed.

Next, a structure of the capacity control valve V will be described. As shown in FIG. 2, the capacity control valve V is mainly formed by the valve housing 10 made of a metal material or a resin material, the main/auxiliary valve element 51 arranged reciprocatably in the axial direction in the valve housing 10, the pressure sensitive valve member 52, the pressure sensitive body 61 that applies axially rightward bias force to the main/auxiliary valve element 51 and the pressure sensitive valve member 52 in accordance with the suction pressure Ps in the intermediary communication passage 55, and the solenoid 80 connected to the valve housing 10, the solenoid that applies drive force to the main/auxiliary valve element 51 and the pressure sensitive valve member 52.

As shown in FIG. 2, the solenoid 80 is mainly formed by a casing 81 having an opening portion 81a which is open on the axially left side, the substantially cylindrical fixed iron core 82 inserted into the opening portion 81a of the casing 81 from the axially left side and fixed on the inner diameter side of the casing 81, a drive rod 83 serving as a rod which is inserted into the fixed iron core 82 reciprocatably in the axial direction, the drive rod whose axially left end portion is inserted and fixed to the main/auxiliary valve element 51, a movable iron core 84 to which an axially right end portion of the drive rod 83 is inserted and fixed, a coil spring 85 provided between the fixed iron core 82 and the movable iron core 84, the coil spring biasing the movable iron core 84 to the axially right side which is the valve opening direction of the main valve 50, and the excitation coil 86 wound on the outside of the fixed iron core 82 via a bobbin.

A recessed portion 81b in which the inner diameter side of an axially left end is recessed to the axially right side is formed in the casing 81. An axially right end portion of the valve housing 10 is inserted and fixed to this recessed portion 81b in a substantially sealed manner.

The fixed iron core 82 is made of a rigid body which is a magnetic material such as iron or silicon steel, and includes a cylindrical portion 82b extending in the axial direction, the cylindrical portion where an insertion hole 82c into which the drive rod 83 is inserted is formed, and an annular flange portion 82d extending in the outer diameter direction from an outer peripheral surface of an axially left end portion of the cylindrical portion 82b. The auxiliary valve seat 82a is formed on the inner diameter side of the opening end surface of the fixed iron core 82, that is, on an axially left end surface of the cylindrical portion 82b.

The fixed iron core 82 is inserted and fixed to a recessed portion 10b recessed to the axially left side on the inner diameter side of an axially right end of the valve housing 10 which is inserted and fixed to the recessed portion 81b of the casing 81 in a substantially sealed manner in a state where an axially right end surface of the flange portion 82d is abutted with a bottom surface of the recessed portion 81b of the casing 81.

The drive rod 83 is formed in a columnar shape, and the axially left end portion inserted and fixed to the main/auxiliary valve element 51 and the axially right end portion inserted and fixed to the movable iron core 84 are formed in a plate shape.

As shown in FIG. 2, a Pd port 12 serving as a discharge port which communicates with the discharge chamber 2 of the variable displacement compressor M, a Ps port 13 serving as a suction port which communicates with the suction chamber 3 of the variable displacement compressor M, and a Pc port 14 serving as a control port which communicates with the control chamber 4 of the variable displacement compressor M are formed in the valve housing 10.

The valve housing 10 is formed in a substantially cylindrical bottomed shape by press-fitting a partition adjusting member 71 forming the pressure sensitive body 61 to be described later to an axially left end portion in a substantially sealed manner. The partition adjusting member 71 can adjust the bias force of the pressure sensitive body 61 by adjusting an installment position of the valve housing 10 in the axial direction.

A first valve chamber 20 communicating with the Pd port 12 where an axially left end portion of the main/auxiliary valve element 51 is arranged, a second valve chamber 30 communicating with the Ps port 13 where an axially right end portion of the main/auxiliary valve element 51 is arranged, and a pressure sensitive chamber 60 serving as a control fluid supply chamber which is communicates with the Pc port 14 where the pressure sensitive body 61 is arranged are formed inside the valve housing 10.

The main/auxiliary valve element 51 and the pressure sensitive valve member 52 connected to this main/auxiliary valve element 51 are arranged reciprocatably in the axial direction inside the valve housing 10. A small-diameter guide hole 10c on which an outer peripheral surface of the main/auxiliary valve element 51 is slidable in a substantially sealed manner is formed in substantial center in the axial direction on an inner peripheral surface of the valve housing 10.

Inside the valve housing 10, the first valve chamber 20 and the second valve chamber 30 are partitioned by the outer peripheral surface of the main/auxiliary valve element 51 and an inner peripheral surface of the guide hole 10c. A tiny gap is formed between the inner peripheral surface of the guide hole 10c and the outer peripheral surface of the main/auxiliary valve element 51 by slightly separating the surfaces from each other in the radial direction. The main/auxiliary valve element 51 is smoothly relatively movable in the axial direction with respect to the valve housing 10.

As shown in FIG. 2, the main/auxiliary valve element 51 is formed in a cylindrical shape. The axially left end portion of the drive rod 83 forming the solenoid 80 is inserted and fixed to the axially right end portion of the main/auxiliary valve element 51, and the pressure sensitive valve member 52 of a separate body formed in a substantially cylindrical shape and a substantially artillery battery shape when seen from the side is inserted and fixed to the axially left end portion of the main/auxiliary valve element 51 in a substantially sealed manner. Both are movable in the axial direction.

By inserting and fixing the plate-shaped axially left end portion of the drive rod 83 to the axially right end portion of the main/auxiliary valve element 51, a plate surface of the axially left end portion of the drive rod 83 and the inner peripheral surface of the main/auxiliary valve element 51 communicate with each other, and at the time of opening the auxiliary valve 53, the fluid can run round to the intermediary communication passage 55 from the second valve chamber 30.

Figure 3:
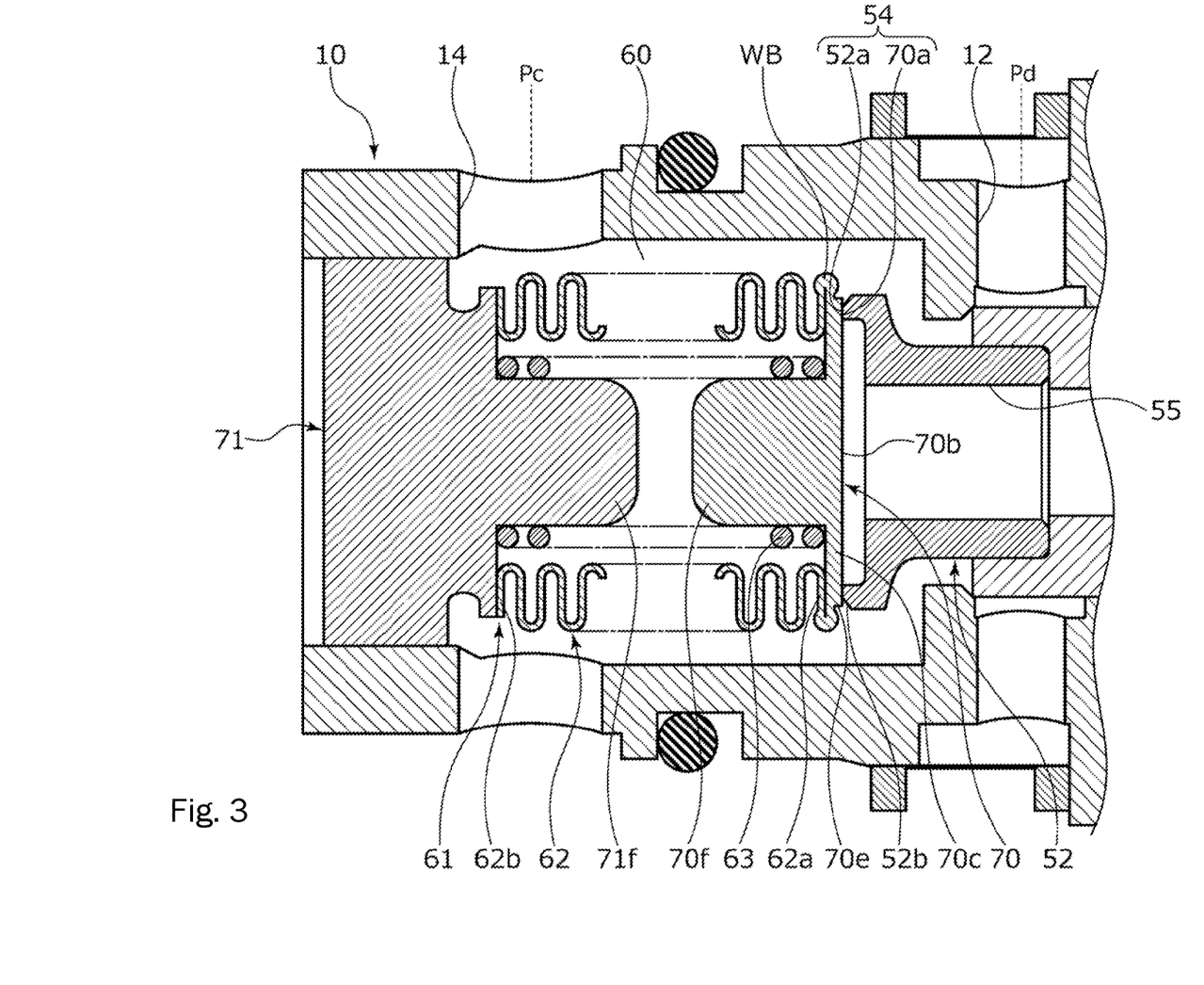
FIG. 3 is an enlarged sectional view of FIG. 2 showing the state where the main valve is closed and the auxiliary valve is opened in the energized state of the capacity control valve in the first embodiment.

As shown in FIG. 3, a taper portion 52b whose diameter is gradually increased from the outer diameter side of the pressure sensitive valve seat 52a to the axially right side and the outer diameter side is formed in an axially left end portion of the pressure sensitive valve member 52, so that the axially left end portion of the pressure sensitive valve member 52 is not brought into contact with a welding bead WB to be described later. Thus, it is possible to reliably form a flow passage providing communication between the pressure sensitive chamber 60 and the intermediary communication passage 55 at the time of opening the pressure sensitive valve 54.

Figure 4:
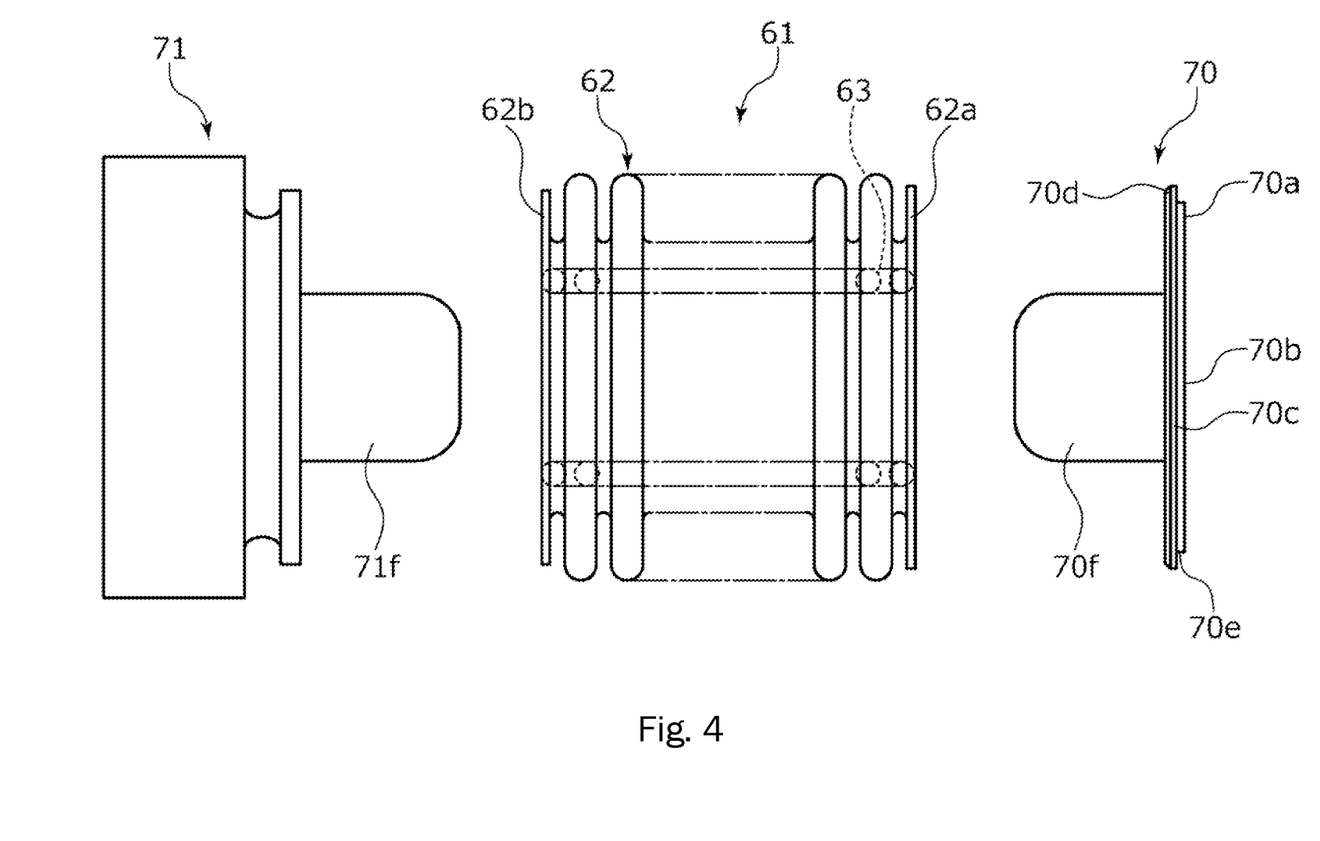
FIG. 4 is an exploded view showing a pressure sensitive body in the first embodiment.

As shown in FIGS. 2 to 4, the pressure sensitive body 61 is formed by a bellows core 62 made of a metal material in which a coil spring 63 is built, the cap 70 welded to a folded outer peripheral end portion 62a in an axially right end of the bellows core 62 in a substantially sealed manner over the circumferential direction, and the partition adjusting member 71 welded to a folded outer peripheral end portion 62b in an axially left end of the bellows core 62 in a sealed manner over the circumferential direction. In FIGS. 2 and 3, for convenience of description, only the welding bead WB formed at a welding point of the outer peripheral end portion 62a on the axially right side of the bellows core 62 and an outer peripheral end portion 70d of the cap 70 is shown, and a welding bead formed at a welding point of the outer peripheral end portion 62b on the axially left side of the bellows core 62 and the partition adjusting member 71 is not shown.

As shown in FIGS. 3 and 4, the cap 70 is formed in a disc shape, and formed by a flat plate portion 70c having the seal face 70a which is formed on the outer diameter side of an axially right end surface and seated on the pressure sensitive valve seat 52a of the pressure sensitive valve member 52, and a Ps pressure receiving surface 70b which is formed to be continuous to and flush with the seal face 70a on the inner diameter side with respect to the seal face 70a, the Ps pressure receiving surface receiving the suction pressure Ps in the intermediary communication passage 55, and a projected portion 70f projecting axially leftward from the inner diameter side of an axially left end surface of the flat plate portion 70c. An axially right end portion of the coil spring 63 built in the bellows core 62 is fitted onto the projected portion 70f of the cap 70. An axially left end portion of the coil spring 63 is fitted onto a projected portion 71f projecting axially rightward from the inner diameter side of an axially right end of the partition adjusting member 71. At the time of contracting the pressure sensitive body 61, that is, the bellows core 62, by abutting the projected portion 70f of the cap 70 with the projected portion 71f of the partition adjusting member 71, a contraction amount of the pressure sensitive body 61 is restricted.

The pressure sensitive body 61 is arranged in the pressure sensitive chamber 60. By biasing the seal face 70a of the cap 70 in the valve closing direction of the pressure sensitive valve 54 by the bias force of the coil spring 63 and the bellows core 62 and abutting with the pressure sensitive valve seat 52a of the pressure sensitive valve member 52, the pressure sensitive valve 54 is closed. That is, axially leftward drive force of the solenoid 80 can act on the pressure sensitive body 61 via the drive rod 83, the main/auxiliary valve element 51, and the pressure sensitive valve member 52, and axially rightward reactive force can be received from the pressure sensitive body 61.

Figure 5A:
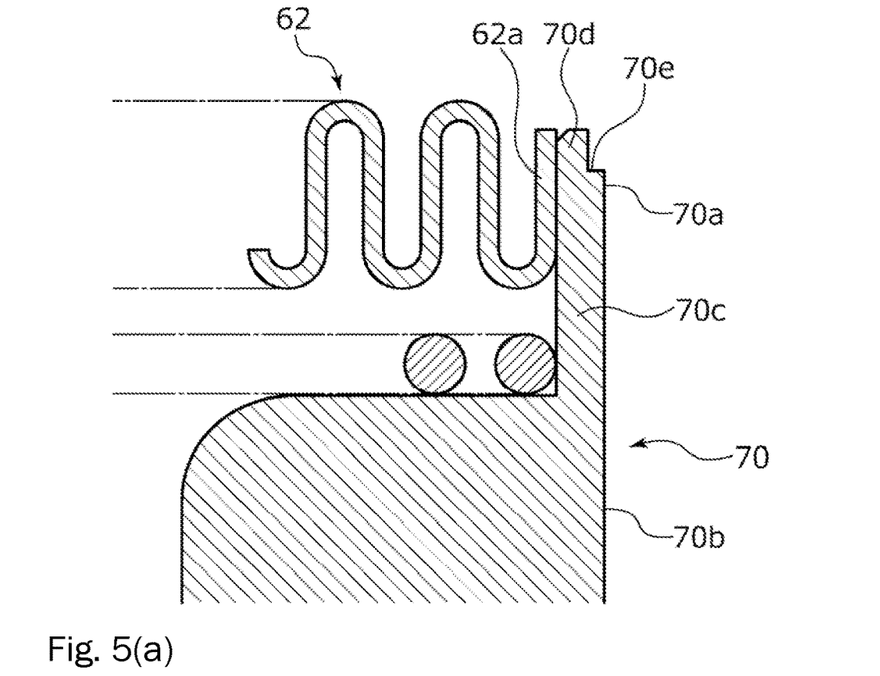
FIG. 5A is a sectional view showing a state before welding where a cap is installed to a bellows core of the first embodiment.

As shown in FIG. 4, by chamfering an axially left end of the outer peripheral end portion 70d of the cap 70 before welding over the circumferential direction, projections such as burrs are removed. According to this, as shown in FIG. 5A, in a state where the cap 70 is installed in the bellows core 62, it is possible to closely attach the folded outer peripheral end portion 62a in the axially right end of the bellows core 62 along the axially left end surface of the flat plate portion 70c. An outer diameter of the cap 70 is formed to be smaller than an outer diameter of the bellows core 62. An outer peripheral surface of the outer peripheral end portion 70d of the cap 70 before welding and an outer peripheral surface of the outer peripheral end portion 62a of the axially right end of the bellows core 62 are aligned to be substantially flush with each other over the circumferential direction.

A recessed portion 70e continuous to the seal face 70a which is formed on the outer diameter side of the axially right end surface of the flat plate portion 70c, the recessed portion being recessed axially leftward in a step shape with respect to the seal face 70a is provided in the outer peripheral end portion 70d of the flat plate portion 70c of the cap 70 over the circumferential direction. That is, an axially right end surface in the outer peripheral end portion 70d of the cap 70 is formed at a position separated axially leftward from the seal face 70a.

Thickness of the flat plate portion 70c of the cap 70 is preferably larger than thickness of the outer peripheral end portion 62a of the bellows core 62. Since the recessed portion 70e is formed in the outer peripheral end portion 70d, the thickness is particularly preferably not less than twice more than the thickness of the outer peripheral end portion 62a of the bellows core 62.

Figure 5B:
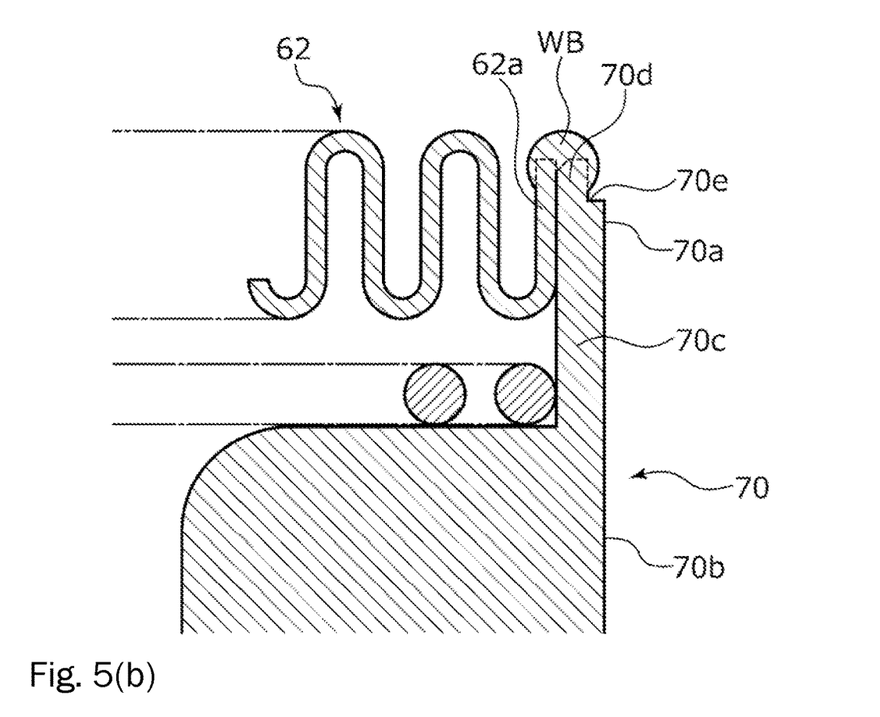
FIG. 5B is a sectional view showing a state where the cap is welded to the bellows core in the first embodiment.

As shown in FIG. 5B, part of the welding bead WB having a substantially disc-shaped section, the welding bead being formed at the welding point by welding the outer peripheral end portion 70d of the cap 70 and the outer peripheral end portion 62a of the bellows core 62 is housed in the recessed portion 70e provided in the outer peripheral end portion 70d of the cap 70.

According to this, it is possible to house part of the welding bead WB formed at the welding point to the outer peripheral end portion 62a of the bellows core 62 by the recessed portion 70e provided in the outer peripheral end portion 70d of the cap 70, and it is possible to suppress a protrusion of the welding bead WB to the side of the pressure sensitive valve seat 52a formed in the pressure sensitive valve member 52, that is, the axially right side to precisely seat the seal face 70a of the cap 70 on the pressure sensitive valve seat 52a. Thus, it is possible to provide the capacity control valve V not influenced by the welding bead WB while ensuring largeness of the Ps pressure receiving surface 70b of the cap 70.

An axially leftward recess amount of the recessed portion 70e is set so that the welding bead WB does not pop out to the side of the pressure sensitive valve seat 52a with respect to the seal face 70a, that is, the axially right side. The axially leftward recess amount of the recessed portion 70e is preferably within a range of not less than one fifth of the thickness of the flat plate portion 70c of the cap 70. Thickness of the cap 70 on the outer diameter side is preferably larger than the thickness of the outer peripheral end portion 62a of the bellows core 62. In the present embodiment, the thickness of the cap 70 on the outer diameter side is about 0.3 mm, and the axially leftward recess size of the recessed portion 70e is about 0.1 mm.

The recessed portion 70e is formed continuously to the seal face 70a on the axially right end surface of the flat plate portion 70c. Thus, it is possible to reduce the thickness of the flat plate portion 70c of the cap 70 while ensuring the largeness of the Ps pressure receiving surface 70b of the cap 70.

Since the recessed portion 70e is formed in a step shape, the welding bead WB is more easily housed in the recessed portion 70e, and it is possible to reliably suppress an influence of a non-uniform protrusion of the welding bead WB to the side of the pressure sensitive valve seat 52a, that is, the axially right side.

The bellows core 62 is welded in a state where the folded outer peripheral end portion 62a is closely attached to the outer peripheral end portion 70d of the cap 70 along the axially left end surface of the flat plate portion 70c. Thus, it is possible to ensure strength of the outer peripheral end portion of the cap 70 while reducing the thickness of the flat plate portion 70c of the cap 70.

The outer peripheral surface of the outer peripheral end portion 70d of the cap 70 and the outer peripheral surface of the outer peripheral end portion 62a of the bellows core 62 are welded in a state where the outer peripheral surfaces are aligned to be substantially flush with each other over the circumferential direction. Thus, it is possible to enhance strength of both the outer peripheral end portion 70d of the cap 70 and the outer peripheral end portion 62a of the bellows core 62. Since welding can be performed from the outer diameter side, workability is good.

The thickness of the flat plate portion 70c of the cap 70 is formed to be larger than the thickness of the outer peripheral end portion 62a of the bellows core 62. Thus, deformation due to thermal expansion or thermal contraction in the outer peripheral end portion 70d of the cap 70 by heat of welding less easily influences the side of the seal face 70a.

The outer diameter of the cap 70 is not more than the outer diameter of the bellows core 62. Thus, it is possible to suppress pop-out of the welding bead WB to the outer diameter side in the pressure sensitive body 61, and it is possible to compactly form the capacity control valve V.

Second Embodiment

Figure 6A:
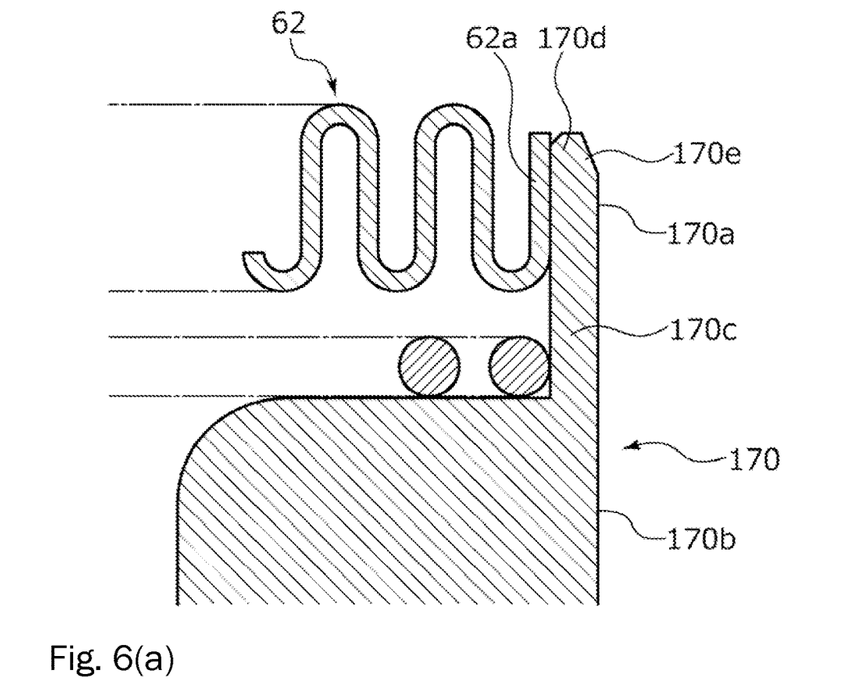
FIG. 6A is a sectional view showing a state before welding where a cap is installed to a bellows core of a second embodiment.

Next, a capacity control valve according to a second embodiment of the present invention will be described with reference to FIG. 6. The same constituent parts as the constituent parts shown in the first embodiment will be given the same reference signs and duplicated description will be omitted.

A capacity control valve V in the second embodiment will be described. As shown in FIG. 6A, in the present embodiment, a taper portion 170e serving as a recessed portion which is continuous to a seal face 170a formed on the outer diameter side of an axially right end surface of a flat plate portion 170c, the taper portion whose diameter is gradually increased from a seal face 170a to the axially left side is provided in an outer peripheral end portion 170d of the flat plate portion 170c of a cap 170 before welding.

Figure 6B:
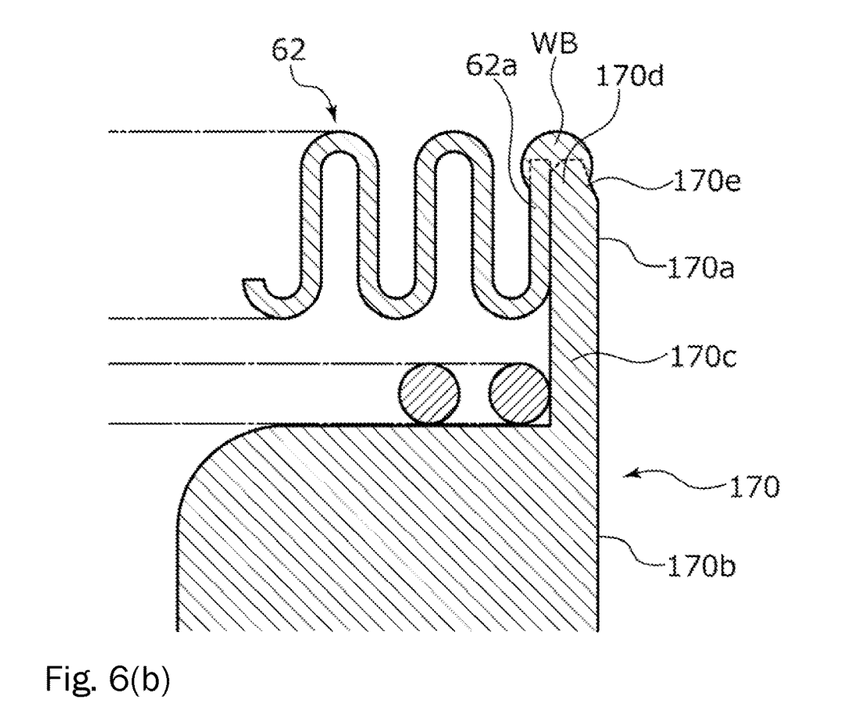
FIG. 6B is a sectional view showing a state where the cap is welded to the bellows core in the capacity control valve of according to a second embodiment of the present invention.

According to this, as shown in FIG. 6B, it is possible to house a welding bead WB formed at a welding point to an outer peripheral end portion 62a of a bellows core 62 by the taper portion 170e provided in the outer peripheral end portion 170d of the cap 170. Thus, it is possible to provide the capacity control valve V in which the seal face 170a is not influenced by the welding bead WB while ensuring largeness of a Ps pressure receiving surface 170b of the cap 170. Since the taper portion 170e can be formed by chamfering as well as an axially left end of the outer peripheral end portion 170d, the taper portion is easily manufactured.

Third Embodiment

Figure 7A:
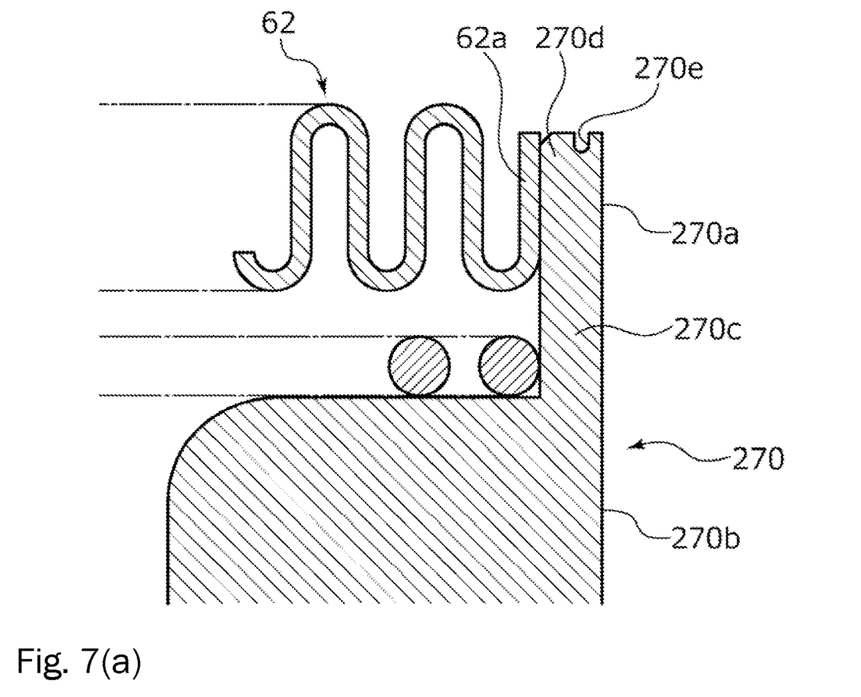
FIG. 7A is a sectional view showing a state before welding where a cap is installed to a bellows core of a third embodiment.

Next, a capacity control valve according to a third embodiment of the present invention will be described with reference to FIG. 7. The same constituent parts as the constituent parts shown in the first embodiment will be given the same reference signs and duplicated description will be omitted.

A capacity control valve V in the third embodiment will be described. As shown in FIG. 7A, in the present embodiment, a groove 270e serving as a substantially semi-circular recessed portion which is recessed in the inner diameter direction from substantial center in the axial direction of an outer peripheral surface is provided in an outer peripheral end portion 270d of a flat plate portion 270c of a cap 270 before welding.

Figure 7B:
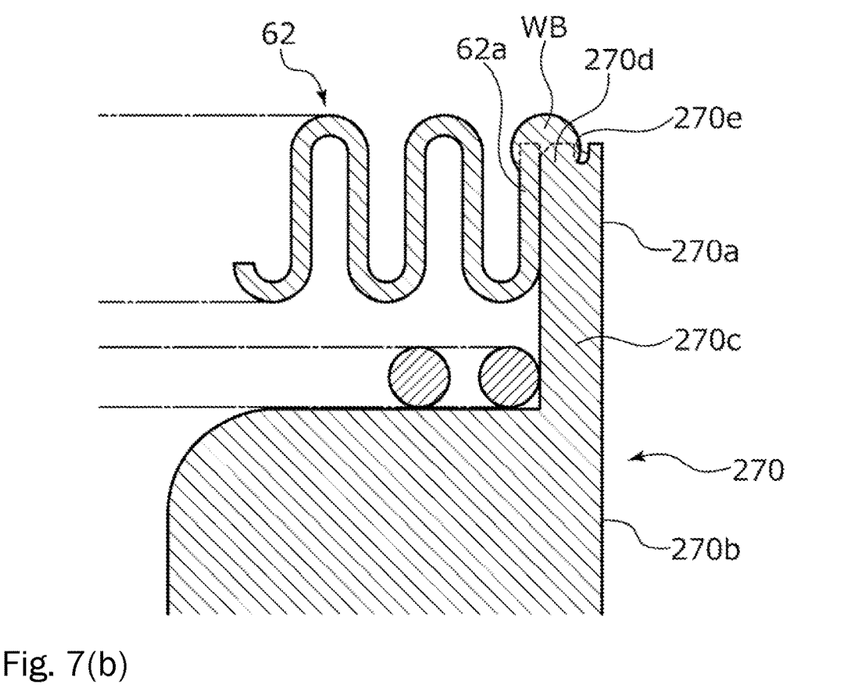
FIG. 7B is a sectional view showing a state where the cap is welded to the bellows core in the capacity control valve of according to a third embodiment of the present invention.

According to this, as shown in FIG. 7B, it is possible to house a welding bead WB formed at a welding point to an outer peripheral end portion 62a of a bellows core 62 by the groove 270e recessed in the inner diameter direction from the outer peripheral surface of the outer peripheral end portion 270d of the cap 270. Thus, it is possible to provide the capacity control valve V in which the seal face 270a is not influenced by the welding bead WB while ensuring largeness of a Ps pressure receiving surface 270b of the cap 270. The groove 270e is not limited to a substantially semi-circular shape but may be formed in a rectangular shape, for example.

The embodiments of the present invention are described above with the drawings. However, specific configurations are not limited to these embodiments but the present invention includes changes and additions within the range not departing from the scope of the present invention.

For example, in the above embodiments, the auxiliary valve 53 is not necessarily provided. An axially right end of the main/auxiliary valve element 51 is only required to function as a support member that receives a load in the axial direction and a sealing function is not necessarily required.

The example in which the main/auxiliary valve element 51 and the pressure sensitive valve member 52 are formed as separate bodies is described. However, both may be integrated.

The communication passage providing direct communication between the control chamber 4 and the suction chamber 3 of the variable displacement compressor M and the fixed orifice are not necessarily provided.

The coil spring may not be used inside the pressure sensitive body but the bellows core may have bias force.

REFERENCE SIGNS LIST

1 Casing
2 Discharge chamber
3 Suction chamber
4 Control chamber
10 Valve housing
10a Main valve seat
12 Pd port (discharge port)
13 Ps port (suction port)
14 Pc port (control port)
20 First valve chamber
30 Second valve chamber
50 Main valve
51 Main/auxiliary valve element (main valve element)
51a Axially left end
51b Axially right end
52 Pressure sensitive valve member (communication passage forming member)
52a Pressure sensitive valve seat (valve seat)
52b Taper portion
53 Auxiliary valve
54 Pressure sensitive valve (on-off valve)
55 Intermediary communication passage (CS communication passage)
60 Pressure sensitive chamber (control fluid supply chamber)
61 Pressure sensitive body (on-off valve element)
62 Bellows core
62a Axially right end portion
62b Axially left end portion
63 Coil spring
70 Cap
70a Seal face
70b Ps pressure receiving surface
70c Flat plate portion
70d Outer peripheral end portion
70e Recessed portion
71 Partition adjusting member
80 Solenoid
82 Fixed iron core
82a Auxiliary valve seat
83 Drive rod (rod)
170 Cap
170e Taper portion (recessed portion)
270 Cap
270e Groove (recessed portion)
V Capacity control valve
WB Welding bead

The invention claimed is:

1. A capacity control valve comprising:
a valve housing provided with a discharge port through which a discharge fluid of discharge pressure passes, a suction port through which a suction fluid of suction pressure passes, and a control port through which a control fluid of control pressure passes;
a rod driven by a solenoid;
a main valve constituted by a main valve seat and a main valve element, the main valve configured to open and close a communication between the discharge port and the control port in accordance with a movement of the rod;
a control-suction communication passage providing a communication between a control fluid supply chamber and the suction port, the control fluid supply chamber being formed in the valve housing and having the control fluid supplied thereinto; and
an on-off valve including a communication passage forming member provided with an annular valve seat in an outer periphery of the control-suction communication passage and an on-off valve element biased in a valve closing direction of the on-off valve toward the annular valve seat, wherein
the on-off valve element further includes a cap having an annular flat seal face and configured for seating on and separating from the valve seat, and a bellows core provided with an axial end portion welded to an outer peripheral end portion of the cap,
a seal surface and a surface formed to be flush with the annular flat seal face on an inner diameter side of the annular flat seal face correctively form one continuous flat surface,
a recessed portion that has an opening portion opened in a radially outward direction so as to directly communicate with the control fluid supply chamber, that is closed at least in an axial direction toward the bellows core and that houses at least part of a welding bead uniting the bellows core to the cap is provided in the outer peripheral end portion of the cap, wherein
all of the welding bead is located on a side of the bellows core with respect to the annular flat seal face in the axial direction,
the axial end portion of the bellows core extends in the radially outward direction, and
the welding bead covers a tip peripheral surface of the axial end portion of the bellows core which faces toward the radially outward direction, and a tip peripheral surface of the outer peripheral end portion of the cap which is on a bellows core side with respect to the recessed portion and which faces toward the radially outward direction.

2. The capacity control valve according to claim 1, wherein
the recessed portion is formed on an outer periphery of the annular flat seal face of the cap continuously to the annular flat seal face, the seal face of the cap being seated on and separated from the valve seat.

3. The capacity control valve according to claim 1, wherein
the recessed portion is formed in a stepwise shape.

4. The capacity control valve according to claim 1, wherein
an outer diameter of the cap is not more than an outer diameter of the bellows core.

5. The capacity control valve according to claim 1, wherein
the axial end portion of the bellows core is folded toward an outer diameter side and welded to the outer peripheral end portion of the cap.

6. The capacity control valve according to claim 1, wherein
the tip peripheral surface of the axial end portion of the bellows core and the tip peripheral surface of the outer peripheral end portion of the cap are flush with each other.

7. The capacity control valve according to claim 2, wherein
the recessed portion is formed in a stepwise shape.

8. The capacity control valve according to claim 2, wherein
an outer diameter of the cap is not more than an outer diameter of the bellows core.

9. The capacity control valve according to claim 2, wherein
the axial end portion of the bellows core is folded toward an outer diameter side and welded to the outer peripheral end portion of the cap.

10. The capacity control valve according to claim 2, wherein
the tip peripheral surface of the axial end portion of the bellows core and the tip peripheral surface of the outer peripheral end portion of the cap are flush with each other.

11. The capacity control valve according to claim 3, wherein
an outer diameter of the cap is not more than an outer diameter of the bellows core.

12. The capacity control valve according to claim 3, wherein
the axial end portion of the bellows core is folded toward an outer diameter side and welded to the outer peripheral end portion of the cap.

13. The capacity control valve according to claim 3, wherein
the tip peripheral surface of the axial end portion of the bellows core and the tip peripheral surface of the outer peripheral end portion of the cap are flush with each other.

14. The capacity control valve according to claim 4, wherein
the axial end portion of the bellows core is folded toward an outer diameter side and welded to the outer peripheral end portion of the cap.

15. The capacity control valve according to claim 4, wherein
the tip peripheral surface of the axial end portion of the bellows core and the tip peripheral surface of the outer peripheral end portion of the cap are flush with each other.

16. The capacity control valve according to claim 5, wherein
the tip peripheral surface of the axial end portion of the bellows core and the tip peripheral surface of the outer peripheral end portion of the cap are flush with each other.

* * * * *